I. C. TERRY.
VEHICLE WHEEL TIRE.
APPLICATION FILED JULY 10, 1912.
1,098,191.
Patented May 26, 1914.
2 SHEETS—SHEET 1.
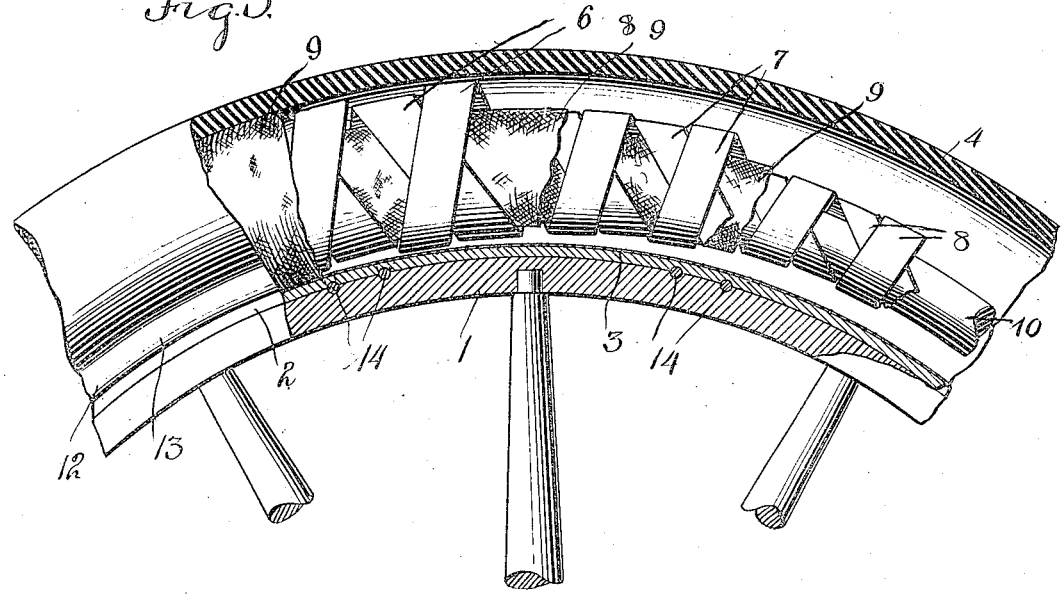
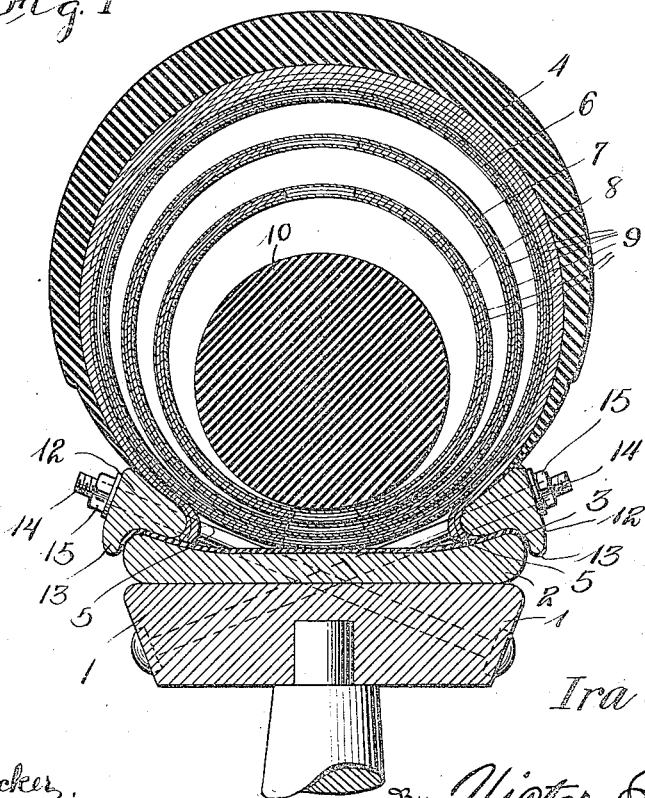
Witnesses
Ernest Crocker
R. M. Smith
Inventor
Ira C. Terry
By Victor J. Evans
Attorney

I. C. TERRY.
VEHICLE WHEEL TIRE.
APPLICATION FILED JULY 10, 1912.

1,098,191.

Patented May 26, 1914.
2 SHEETS—SHEET 2.

Inventor
Ira C. Terry

Witnesses
Ernest Crocker,
P. M. Smith.

By Victor J. Evans
Attorney

UNITED STATES PATENT OFFICE.

IRA C. TERRY, OF MONROE, LOUISIANA.

VEHICLE WHEEL-TIRE.

1,098,191.  Specification of Letters Patent.  Patented May 26, 1914.

Application filed July 10, 1912. Serial No. 708,638.

*To all whom it may concern:*

Be it known that I, IRA C. TERRY, a citizen of the United States, residing at Monroe, in the parish of Ouachita and State of Louisiana, have invented new and useful Improvements in Vehicle Wheel-Tires, of which the following is a specification.

This invention relates to tires, the object in view being to provide an effective spring tire as a substitute for the ordinary pneumatic tire now in common use, the same embodying a plurality of cushioning or take-up springs which will successively and mutually support each other, in accordance with the load imposed thereon, so as to avoid the possibility of fracturing any one of the springs forming elements of the tire.

A further object of the invention is to provide a spring tire of the class referred to which will be practically noiseless and which will remain so, as long as the tire is in use.

A further object is to provide simple and effective means for tightening the shoe or outer casing of the tire around the nested springs, so as to secure the tire as a whole firmly to the rim of the wheel.

The construction hereinafter described results in a non-pneumatic, non-collapsible, and non-puncturable tire.

With the above and other objects in view, the invention consists in the construction, combination and arrangement of parts, as will be hereinafter more fully described, illustrated in the accompanying drawings, and pointed out in the claim hereunto appended.

Figure 1:
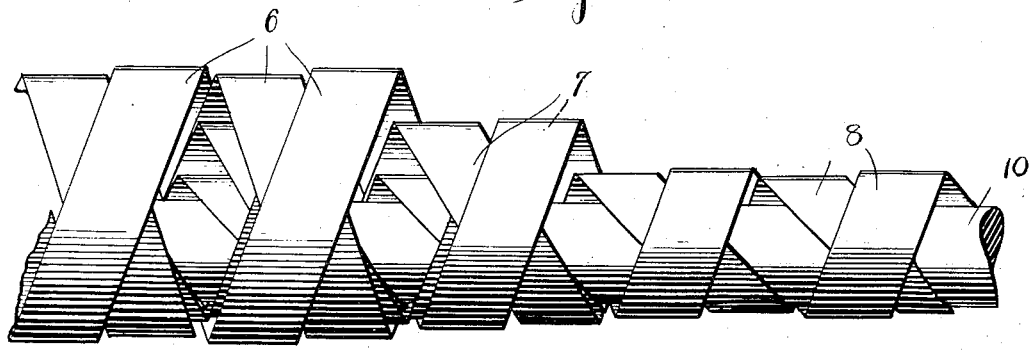
Figure 2:
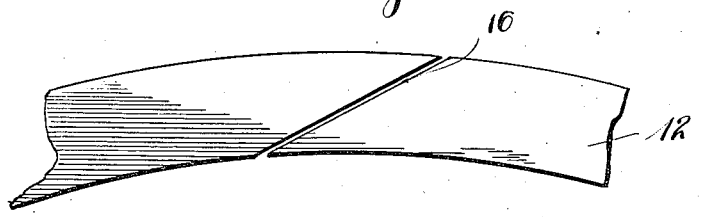
Figure 5:
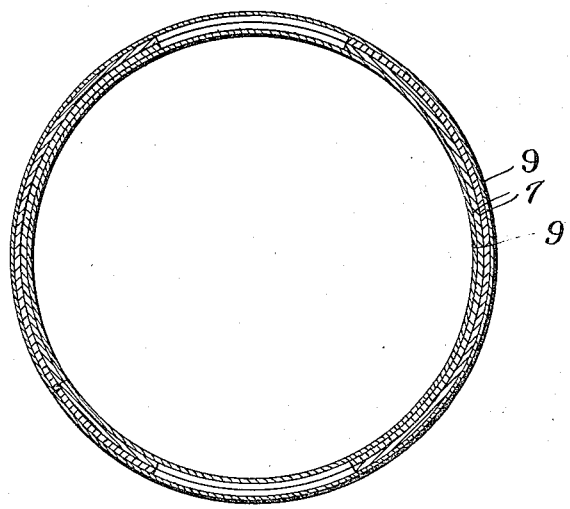

In the drawings: Figure 1 is a cross section through a tire and wheel rim, embodying the present invention. Fig. 2 is a detail view of the adjacent beveled extremities of one of the clencher rings. Fig. 3 is a longitudinal section through a portion of the tire. Fig. 4 is a side elevation of a section of the nested springs, showing the arrangement of the several coils thereof before being bent into annular form. Fig. 5 is a detail cross section of one pair of the springs, showing the inclosing casing therefor.

Referring now to the drawings, 1 designates the ordinary felly of a wheel, such as is used in connection with automobiles, and 2 a metal tire receiving and holding rim, extending around the outer face of the felly 1. In the preferred embodiment of this invention, the outer or concaved face of the rim 2 is lined with a layer 3 of rubber, leather, or like material, thereby forming a soft seat for the tire, hereinafter described.

The tire comprises an outer shoe or casing 4, composed of rubber or rubberized fabric, or a combination of materials, such as are now employed in the manufacture of outer casings or shoes of tires. Said outer casing or shoe is provided with the hook-shaped beads 5 extending along the opposite marginal edges thereof for engagement with the clencher rings, hereinafter particularly referred to.

Within the outer shoe or casing 4 I arrange a plurality of sets of compound springs 6, 7 and 8. While three of such sets are shown, it will be apparent that more or less sets may be employed, as may be expedient, and in order to support the load for which the vehicle is designed. Each set or spring unit is composed of two spirally wound steel straps, and by reference to the drawings, it will be observed that the two springs of each set or unit are wound in reverse directions, and one directly upon the other, so that they lie in actual contact at all times. Each set of springs or spring unit is also inclosed by a fabric casing 9, so that the coils are held in the same relation to each other and prevented from coming into contact with the adjacent set, whether at the outer side or upon the inner side thereof.

Within the innermost spring unit, there is arranged a central cushioning core 10, preferably composed of solid rubber, and the internal circumference of said core 10 is such that when the ends thereof are joined together and placed upon the rim, the inner portions of all of the units or sets of springs will be confined closely against the rubber facing 3 of the metal rim 2, hereinabove described. In other words, all of the parts of the tire will be brought into the nested arrangement, shown in Fig. 1.

In order to draw the outer casing or shoe 4 tightly around the outermost spring unit, I provide a pair of oppositely arranged clencher rings 12, each of which is substantially wedge-shaped in cross section and provided with a comparatively narrow inner portion which engages the hook-shaped bead of the adjacent side of the tire, so that as the wedge-shaped clencher rings are forced inward, they serve to draw the outer shoe tightly around the tire, in the manner clearly shown in Fig. 1. Each of the clencher rings may be provided with an inwardly extending lip or flange 13, for the purpose of limiting the extent to which the rings may be forced inward. In order to draw the rings inward and retain the same firmly in place, bolts 14 pass through the said rings, and also through openings in the metal rim 2 and the wooden felly 1, and are provided with nuts 15, as shown, and by this means, any desired tension may be put upon the outer shoe or casing, in accordance with the load to be imposed upon the tire.

Each of the clencher rings may be obliquely slit or divided, as shown at 16 in Fig. 2, to facilitate placing said rings in position and removing the same therefrom.

By covering the springs with a fabric casing, as described and shown, the springs of each unit are prevented from coming into actual contact with the spring of an adjacent unit, which prevents crystallization of the metal of which the springs are composed.

What is claimed is:

A vehicle wheel tire comprising nested spring units, each unit bearing an eccentric relation to the other units in cross section and embodying a plurality of strap springs coiled reversely one upon and in metallic contact with another, an independent flexible casing covering each spring unit both inside and outside, an outer shoe inclosing all of said units, and a cushioning core extending around within the inner spring unit and serving to elastically hold the cover units in contact with each other along their inner peripheries.

In testimony whereof I affix my signature in presence of two witnesses.

IRA C. TERRY.

Witnesses:
  TRAVIS O. IRVIN,
  J. M. BEARD, Jr.